July 15, 1969     M. J. PRIEFERT     3,455,574
TOWING HITCH FOR VEHICLES

Filed Aug. 1, 1967     2 Sheets-Sheet 1

INVENTOR.
MARVIN J. PRIEFERT
BY *Rudolph L. Lowell*
ATTORNEY.

July 15, 1969  M. J. PRIEFERT  3,455,574
TOWING HITCH FOR VEHICLES
Filed Aug. 1, 1967  2 Sheets-Sheet 2
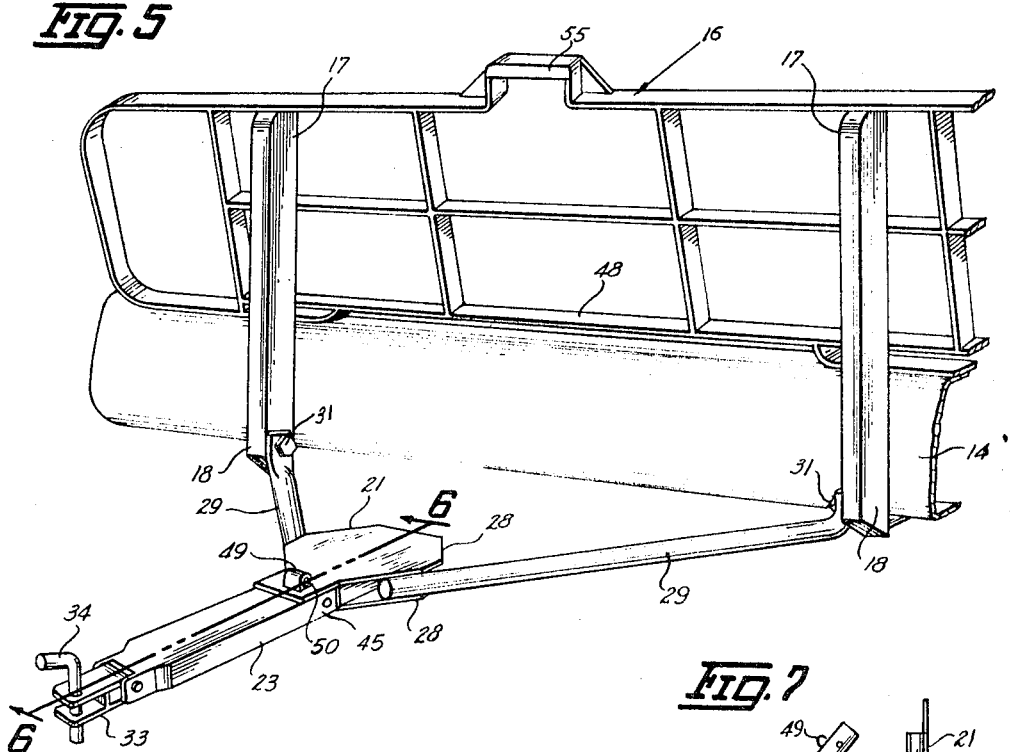
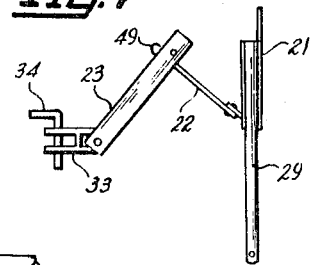
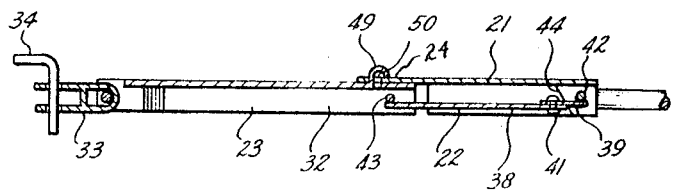
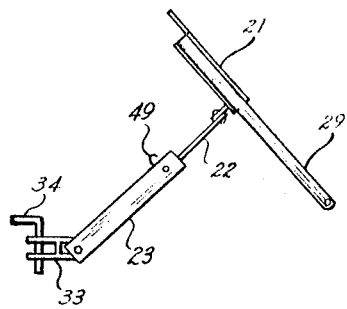
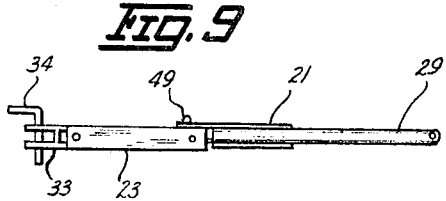
INVENTOR.
MARVIN J. PRIEFERT
BY Rudolph L. Lowell
ATTORNEY.

United States Patent Office 3,455,574
Patented July 15, 1969

3,455,574
TOWING HITCH FOR VEHICLES
Marvin J. Priefert, R.R. 1, Mount Pleasant, Tex. 75455
Filed Aug. 1, 1967, Ser. No. 657,692
Int. Cl. B60d 1/00; B60r 19/02
U.S. Cl. 280—491                    6 Claims

ABSTRACT OF THE DISCLOSURE

The automobile hitch unit of this invention is of an articulated construction having a coupling member at one end connectible to a towing vehicle and having its opposite end pivotally mounted on the front bumper of a vehicle to be towed. The hitch unit includes a plurality of elongated body members, with adjacent members pivotally connected together for relative movement about axes extended transversely thereof. The body members are relatively movable to an upright folded or storage position located above the central portion of the bumper and extendable to a horizontal unfolded or operating position projected forwardly from the bumper to form a rigid tow bar connection between the towed and towing vehicles. Certain of the body members remote from the bumper, when the hitch unit is in an unfolded position, are supported for swingable movement longitudinally of the bumper, relative to the remaining body members. The hitch unit, therefor, when moved out of the upright folded position, provides for the attachment of the coupling member thereon with an associated coupling member on the owing vehicle, when the coupling members are located within a semi-circular area defined by the extended length of the swingable portion of the hitch unit. With the coupling members attached, and on advance of the towing vehicle, the hitch unit is automatically extended and locked in an extended position for pivotal up and down movement on the front bumper.

SUMMARY OF THE INVENTION

The articulated hitch unit of this invention is of a simple and rugged construction and adapted to be pivotally supported on the front bumper of a towed vehicle to a folded upright storage position adjacent the bumper, and to an operative or unfolded position extended outwardly from the bumper. Additionally, a portion of the hitch unit is swingable transversely of the vehicle when the hitch unit is out of its storage position. Thus, when released from its folded position, the hitch unit may be extended concurrently with the swingable portion thereof being swung transversely of the vehicle for connection with a towing vehicle having a hitch coupling member located within the path of arcuate movement of the extended length of the swingable portion of the hitch unit. As the towing vehicle is advanced the hitch unit is automatically extended to its full length and locked against folding and swinging movement to form a rigid tow bar pivotally supported for up and down movement on the towed vehicle. The articulated construction of the hitch unit thus eliminates the necessity for initial alignment of its coupling and with the coupling member on the towing vehicle for connecting purposes, while automatically providing a rigid bar structure for towing purposes when the coupling connection is completed and the towing vehicle advanced. In its storage position the hitch unit is compactly folded in an upright position above the central portion of the front bumper of the vehicle to function as a guard for the usual vehicle grille.

DETAILED DESCRIPTION

Further objects, features and advantages of the invention will become apparent from the following description when taken in connection with the accompanying drawing in which:

FIG. 5 is an enlarged perspective view illustrated similarly to FIG. 3 showing the hitch unit in its fully extended operative position;

FIG. 6 is a sectional view as seen along the line 6—6 in FIG. 5; and

FIGS. 7, 8 and 9 are diagrammatic views showing relative changed positions of the parts of the hitch unit, as the hitch unit is progressively unfolded from a storage position to an operating position.

Figure 1:
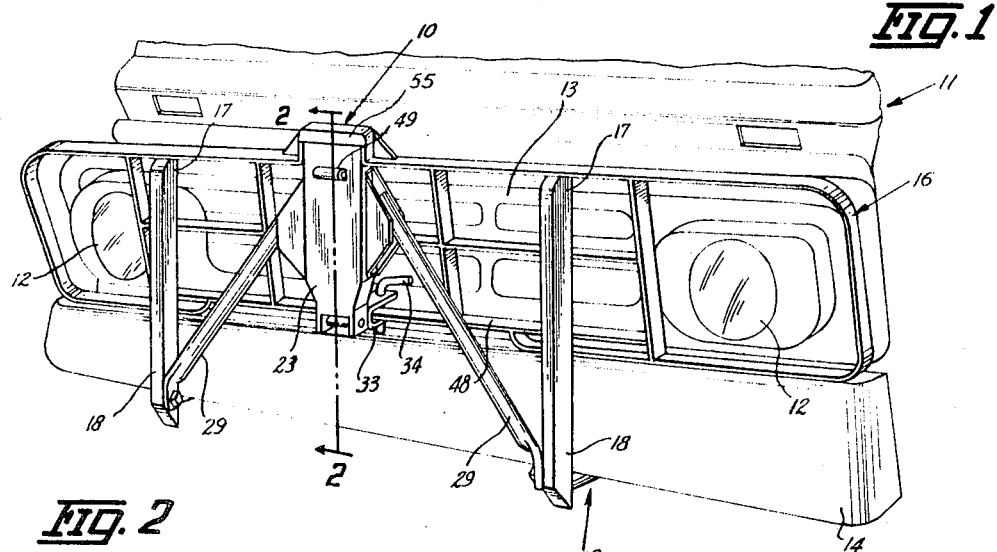
FIG. 1 is a perspective view of the front portion of a vehicle to be towed showing the hitch unit in assembly relation with the vehicle front bumper and in an upright folded or storage position, wherein it forms a guard for the central portion of the vehicle grille.

Referring to the drawings, the hitch unit 10 of this invention is illustrated in FIG. 1 in assembly relation with the front end of a vehicle 11, to be towed, having headlights 12, a grille 13 and a front bumper 14. A guard structure 16 for the headlights 12 and grille 13 is positioned above the front bumper 14 and includes a pair of upright transeversely spaced mounting members 17 the lower end portions 18 of which are positioned against the front side of the bumper and rigidly secured to the bumper by means indicated generally at 19.

Figure 4:
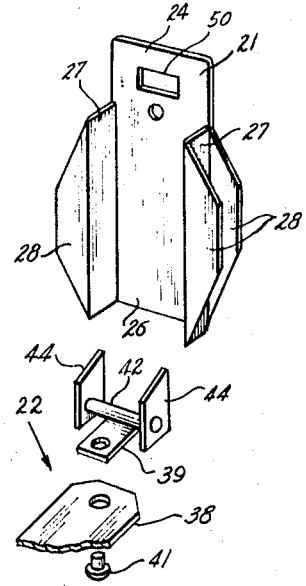
FIG. 4 is an exploded perspective view showing a connector structure that forms part of the hitch unit.
Figure 3:
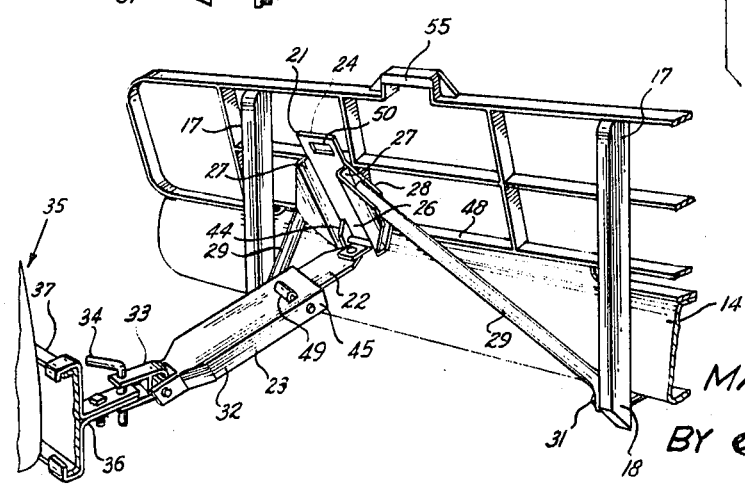
FIG. 3 is a reduced foreshortened perspective view illustrated similarly to FIG. 1 showing the hitch unit partially extended and with a coupling member thereon connected with a coupling member on a towing vehicle.

The hitch unit 10 is an articulated assembly of three elongated body members 21, 22 and 23 (FIG. 3) located between the mounting members 17. The end body member 21 (FIGS. 3 and 4), hereinafter to be referred to as the rear body member, is of a channel shape in transverse section having a base or web with a projected end portion 24 and an opposite end portion 26. Secured to the outer side of each leg section 27 is a pair of laterally spaced gusset plates 28. A pair of supporting arms 29 arranged to opposite sides of the rear body member 21 have their inner ends located between and secured to an associated pair of gusset plates 28 so as to extend in a divereged relation away from the web end portion 24 of the rear body member 21. The outer ends of the support arms 29 are pivotally connected at 31 to the lower ends of the mounting members 17 for up and down pivotal movement about an axis extended longitudinally of the front bumper or hitch unit supporting member 14.

The end body member 23 (FIGS. 3 and 6), hereinafter referred to as the front body member is of a channel shape in transverse section with the leg sections 32 thereof projected forwardly to pivotally support therebetween a coupling member or clevis unit 33 that is connectable through a hitch pin 34 with an associated coupling member 36 suitably secured to the rear bumper 37 of a towing vehicle 35.

The intermediate body member 22 (FIGS. 4 and 6) is comprised of a pair of flat sections 38 and 39, formed of a strap material, and having their adjacent ends pivotally connected together by a laterally extended rivet or pivot pin 41. The section 39 is of an appreciably shorter length than the section 38 and has the end thereof remote from the pivot 41 secured to a pivot pin 42 which extends transversely of the rear body member 21. The pivot 42 is supported in a pair of transverely spaced lugs 44 that are secured to the inner surfaces of the leg sections 27 and web portions 26 of the rear body member 21. The end of the section 38, remote from the pivot 41, is secured to a pivot 43 that extends transversely of the front member 23 between the leg sections 32.

It is seen, therefore, that the intermediate member 22 and the front member 23 are movable together about the pivot pin 42 and that the front member 23 and section 38 of the intermediate body member 22 are swingable together about the pivot 41 in a plane extended longitudinally of the front bumper 14. These movements may take place concurrently or separately for any moved position of the rear body member 21 relative to the pivots 31. The pivots 41 and 42 and the body member section 39 thus form a connector that provides for a pivotal movement of the front body member 23 about the axes 41 and 42 relative to the rear body member 21, concurrently with a pivotal movement of the front body member 23 about the pivot 43 relative to the intermediate member 22.

Figure 2:
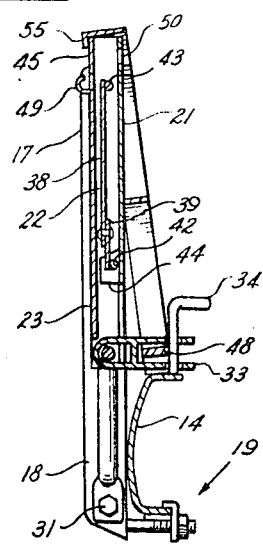
FIG. 2 is a sectional view as seen along the line 2—2 in FIG. 1.

The rear and front body members 21 and 23, respectively, are of substantially the same length (FIG. 2), with the intermediate body member 22 being of a shorter length so as to extend within the longitudinal confines of the members 21 and 23 when the hitch unit 10 is in a folded or storage position. In this storage position, and as shown in FIG. 2, the rear body member 21 is vertically arranged at a position above the front bumper 14 and forwardly thereof. The intermediate member 22 is within and in a back-to-back relation with the web of rear body member 21. The intermediate member 22 is also received within the front body member 23 in a back-to-back relation with the web thereof.

The back-to-back relation between the members 22 and 23 takes place by virtue of the front member 23 being of a lesser width than the rear body member 21 for reception in a nested relation within the rear body member 21. In other words in the folded position of the hitch unit 10 the channel or body members 21 and 23 are open to each other, with the intermediate member 22 within the front body member 23 and with both the members 22 and 23 received within the rear body member 21. The members 21 and 23 thus form a boxlike structure at the central portion of the grille guard 16 to complement the guard function thereof.

The hitch unit 10 (FIG. 2) is retained in its folded storage position by initially locating the end 45 of the member 23 behind and in bearing engagement with the rear side of a transversely extended abutment member 55 provided centrally of the upper side of the guard structure 16. This engagement takes place while the hitch unit 10 is partially unfolded. With the end 45 of the member 23 engaged by the abutment member 55 the hitch 10 is moved to a fully folded position and the clevis unit 33 is pivotally moved to a position extended rearwardly across the top side of the front bumper 14. With a lower frame member 48 of the guard structure 16 received within the clevis unit 33, the hitch pin 34 is inserted through the clevis unit at a position rearwardly of the member 48 to positively lock the hitch unit 10 in its storage position.

In use, and on removal of the hitch pin 34, the front body member 23 is manually gripped at the clevis end thereof and moved forwardly. The body members 21, 22 and 23 may then be simultaneously unfolded, concurrently with the swinging movement of the members 22 and 23 as a unit relative to the pivot 41, to locate the clevis unit 33 for connection with the coupling member 36 on the towing vehicle. In this respect it will be appreciated that such connection can be made when the clevis unit 33 and coupling member are at different vertical levels and the vehicles 11 and 35 are out of longitudinal alignment and spaced a distance apart which does not exceed the combined length of the body members 22 and 23.

Thus, as shown in FIG. 7, the hitch unit 10 is illustrated with the body members 22 and 23 partially unfolded and the body member 21 in an upright position. These relative positions of the body members provides for the vehicles 11 and 35 being connected together when the coupling member 36 is located relative to the clevis unit 33, so as to be within a connecting zone or area that is defined by the partially unfolded length of only the members 22 and 23 and their swinging movement about the pivot 41. The radius of swinging movement of the clevis unit 33 transversely of the vehicle 11, to opposite sides of the pivot 41 may be progressively increased to a maximum radius defined by a longitudinal alignment of the members 22 and 23, as illustrated in FIG. 8.

On pivotal downward movement of the rear body member 21 from its upright position in FIG. 7, and through upwardly and forwardly inclined positions, one of which such positions is shown in FIG. 8, to a position approaching its longitudinally aligned relation with the members 22 and 23, shown in FIG. 9, the maximum radius of transverse swinging movement of the clevis unit 33 may be maintained, or reduced, concurrently with accommodating variations in the longitudinal separation of the coupling members 33 and 36, within the fully extended length of the hitch unit 10.

On completion of the coupling connection, and on advance of the towing vehicle 35, the members 21, 22 and 23 are automatically extended into longitudinal alignment (FIGS. 5 and 6) with the member 22 located within the rear body member 21 and with the web portion 24 on the rear body member 21 resting on the top side of the rear end portion of the front body member 23. This engagement of the body members 21 and 23 locks all three body members 21, 22 and 23 against movement in a downward direction out of longitudinal alignment.

To lock the body members 21, 22 and 23 against upward movement out of longitudinal alignment the front member 23 is provided at its end remote from the clevis unit 33 with an upwardly projected spring latch 49 that is received within an opening 50 formed in the web portion 24 of the rear body member 21 for releasable engagement with the top side of the web portion 24. It is seen, therefore, that the hitch unit 10 is not only automatically extended on advance of the towing vehicle 35 but is also automatically locked in its extended or unfolded position so as to form a rigid tow bar connection, between the towing and towed vehicles 11 and 35, that is pivotally movable relative to the pivots 31 and clevis unit 33.

I claim:

1. A hitch unit for a towed vehicle having a transversely extended hitch unit supporting member comprising:
   (a) an articulated assembly of a plurality of elongated body members,
   (b) means pivotally connecting together adjacent ones of said body members for relative pivotal movement to a first folded position wherein adjacent ones of said members are in a back-to-back relation, and to a second unfolded position wherein said members are extended in longitudinal alignment,
   (c) means pivotally connecting an end one of said members on said supporting member for pivotal up and down movement,
   (d) means on the other end one of said members adapted for attachment to a towing vehicle,
   (e) with the body member adjacent said first end body member comprised of a pair of sections,
   (f) means pivotaly connecting that one of said sections which is remote from said first end body member to the other of said sections for swinging movement longitudinally of said supporting member, and
   (g) means for automatically locking said members in said second position therefor against relative movement.

2. A hitch unit for a towed vehicle having a front bumper comprising:
   (a) a first channel shape body member, (b) a pair of arm members secured to and extended in a diverged relation from opposite sides of said body member, (c) means pivotally connecting the free ends of said arm members on said front bumper for pivotal up and down movement of said first body member, (d) a pair of body members hinged together at one of the ends thereof for relative pivotal movement to a first position in longitudinal alignment and to a second position in a back-to-back relation, (e) a connector member located within and supported on said first body member adjacent one end thereof for pivotal movement about an axis extended transversely of said body member, (f) means connecting the free end of one of said pair of body members to said connector member for swinging movement longitudinally of said front bumper, (g) a coupling member movably connected to the free end of the other one of said pair of members, (h) said pair of members, in the second position therefor, being pivotally movable as a unit about said transverse axis into a nested relation within said first body member concurrently with a pivotal movement of said first body member to a upright position projected upwardly from said front bumper and said pair of members, on relative pivotal movement from said nested relation to the first position therefor, being swingable as a unit relative to said first body member concurrently with being pivotally movable about said transverse axis, into longitudinal alignment with said first body member wherein said one of the pair of members is received within said first body member, and (i) coacting means on the other one of said pair of members and on said first member for releasably locking said first body member and said pair of members in longitudinal alignment.

3. A hitch unit for a towed vehicle having a front bumper comprising:
(a) an articulated assembly of three elongated body members pivotally connected together for relative pivotal movement about axes extended transversely thereof,
(b) first means pivotally connecting a first end one of said body members on said bumper for up and down pivotal movement of said first member,
(c) means on the second end one of said body members attachable to a towing vehicle,
(d) second means pivotally connecting the adjacent ends of said second body member and the third one of said body members,
(e) third means connecting the other end of said third body member for pivotal and swingable movement on said first body member at a position intermediate the ends of said first body member,
(f) said second and third body members being pivotally and swingably movable as a unit relative to said third connecting means; movable relative to said second connecting means into a back-to-back relation and extended longitudinally of said first body member, being movable as a unit about said third connecting means to a position against said first body member whereby, on pivotal movement of said first body member about said first pivot means to an upright position, the hitch unit is collapsed and projected upwardly adjacent said bumper, and (g) coacting means on said first and second body members for releasably locking said three body members in longitudinal alignment against movement relative to said second and third connecting means.

4. A hitch unit for a towed vehicle having a transversely extended hitch unit suporting member comprising:
(a) an articulated assembly including three elongated body members arranged in an end to end relation,
(b) means pivotally connecting together adjacent ones of said three body members for relative pivotal movement about transversely extended axes to a first folded position wherein adjacent ones of said body members are in a back-to-back relation, and to a second unfolded position wherein said body members are extended in longitudinal alignment,
(c) means pivotally connecting a first end one of said body members on said supporting member for up and down pivotal movement about an axis extended longitudinally of said supporting member,
(d) means on the second end one of said body members adapted for attachment to a towing vehicle,
(e) the third intermediate body member comprised of a pair of sections,
(f) means pivotally connecting one of said sections to the first end one of said body members for swinging movement in a plane extended longitudinally of said suporting member, and
(g) coacting means on said two end body members for automatically locking said three body members in the second position therefor against relative movement.

5. A hitch unit according to claim 4 wherein:
(a) each of said two end body members is of a channel shape in transverse cross section faced downwardly when the three body members are in the second position therefor, and said second end body member being receivable within the first end body member when the three body members are in the first position therefor, and
(b) said intermediate body member being formed of a flat plate material.

6. A hitch unit according to claim 4 wherein:
(a) said coacting means includes a spring latch projected upwardly from the second end body member when the three body members are in the second position therefor, and a catch on the first end body member releasably engageable with said spring latch concurrently with the longitudinal extension of said three body members to the second position therefor.

References Cited

UNITED STATES PATENTS

| | | | |
|---|---|---|---|
| 2,179,070 | 11/1939 | Weise | 280—491 X |
| 2,880,016 | 3/1959 | Peterson | 280—491 |
| 2,954,569 | 10/1960 | McCord | 280—491 X |
| 3,055,023 | 9/1962 | McCord | 280—491 X |
| 3,287,027 | 11/1966 | Schuckman | 280—491 |

LEO FRIAGLIA, Primary Examiner

U.S. Cl. X.R.

293—69